Figures 1, 2:
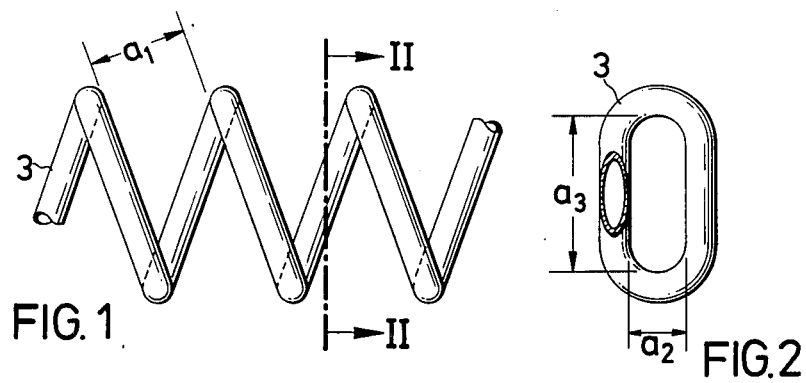

United States Patent [19]

Disselbeck et al.

[11] Patent Number: 4,619,317

[45] Date of Patent: Oct. 28, 1986

[54] HEAT EXCHANGER

[75] Inventors: Dieter Disselbeck, Bad Soden am Taunus; Hans-Peter Vollrath, Eppstein, both of Fed. Rep. of Germany

[73] Assignee: Hoechst Aktiengesellschaft, Fed. Rep. of Germany

[21] Appl. No.: 617,692

[22] Filed: Jun. 6, 1984

[30] Foreign Application Priority Data

Jun. 8, 1983 [DE] Fed. Rep. of Germany ....... 3320632

[51] Int. Cl.$^4$ ................................................. F28D 7/00
[52] U.S. Cl. ..................................... 165/162; 165/163
[58] Field of Search ................................ 165/162, 163

[56] References Cited

U.S. PATENT DOCUMENTS

| 2,693,346 | 11/1954 | Petersen | 165/163 X |
| 3,240,675 | 3/1966 | Weber | 165/163 X |
| 4,272,667 | 6/1981 | Golowacz | 165/163 X |
| 4,313,491 | 2/1982 | Molitor | 165/163 X |
| 4,433,722 | 2/1984 | Fueglister | 165/163 X |
| 4,442,799 | 4/1984 | Craig et al. | 165/163 X |

FOREIGN PATENT DOCUMENTS

| 2419751 | 4/1974 | Fed. Rep. of Germany | 165/163 |
| 623100 | 9/1978 | U.S.S.R. | 145/163 |

Primary Examiner—Albert W. Davis, Jr.
Assistant Examiner—Peggy A. Neils
Attorney, Agent, or Firm—Connolly and Hutz

[57] ABSTRACT

The heat exchanger comprises a support frame, a feed line, a header for forward flow, heat exchange tubes, a header for the return flow and a discharge line for the heat exchange medium. The heat exchange tubes are here helical capillary tubes. They are fixed interlocking one another by means of connecting elements. The ends of the heat exchange capillaries lead into the forward flow header and into the return flow header for the heat exchange medium.

8 Claims, 7 Drawing Figures

HEAT EXCHANGER

The invention relates to a heat exchanger comprising a support frame and a feed line, a header for the forward flow, heat exchange tubes, a header for the return flow and a discharge line for the heat transfer medium.

The state of the art has disclosed plate heat exchangers and tube bundle heat exchangers of the most diverse structures, for example heat exchangers of hollow fibers which are arranged in a straight line and parallel to one another. So-called tube register heat exchangers have also been disclosed, for example as solar absorbers or as an energy fence. The external tube diameters are as a rule greater than 15 mm. All these heat exchanger systems exploit the outer heat transfer area which is enlarged due to the circular cross-section of the tubes, the heat exchange being related linearly to the length of the tubes. However, the heat transfer is decisively determined by the external diameter of the tubes used. It was the object of the invention substantially to improve the known heat exchangers which are constructed from heat exchange tubes.

This is achieved when the heat exchange tubes are capillary tubes (3) which are fixed interlocking one another by means of connecting elements (6), and the ends of the capillary tubes (3) lead into the forward flow header (2) and the return flow header (4) of the heat transfer medium. Preferably, the heat exchange capillaries (3) are composed of metal, glass, ceramics or plastics. In particular, the heat exchange capillaries (3) have an external diameter of from 0.1 to 10 mm and wall thicknesses of from 40%-5% of the external diameter of the heat exchange capillaries (3). Advantageously, the clear spacings $a_1$ between the capillary windings are 1 to 5 times the external diameter of the heat exchange capillaries (3). In a preferred embodiment, the distribution system for the heat exchange medium forms at the same time the support frame (R) of the heat exchanger.

According to the invention, the heat exchange tubes are capillary tubes (3) in a helical, mutually interlocking arrangement. Such structures of solid plastic monofilaments can, for example, be produced in the same way as that described in German OffenLegungsschrift No. 2,419,751 for the two-dimensional structures of a wire link conveyor.

The construction of such a heat exchanger according to the invention will be described below by reference to FIGS. 1 to 7, in which: The support frame is marked R, the feed line is marked 1, the header (forward flow) is marked 2, the heat exchange capillaries are marked 3, the header (return flow) is marked 4, the discharge line is marked 5, the connecting elements are marked 6, the clear spacing between the capillary windings is marked $a_1$, the clear width of the capillary winding is marked $a_2$ and the clear height of the capillary winding is marked $a_3$.

Figure 3:
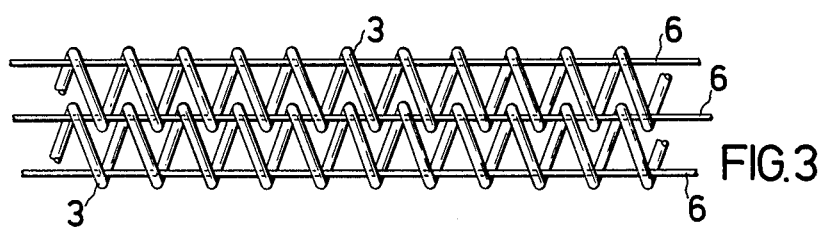
Figure 4:
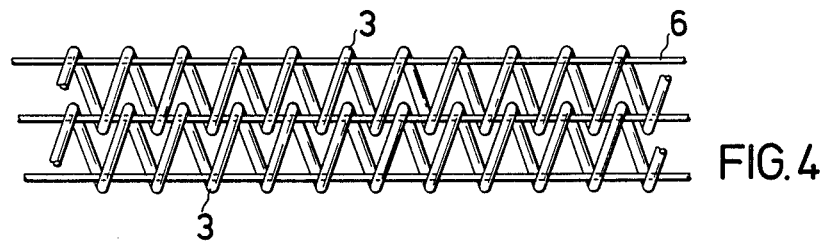
Figure 5:
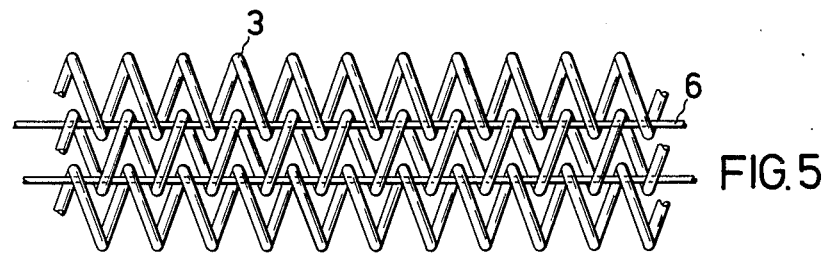
Figure 6:
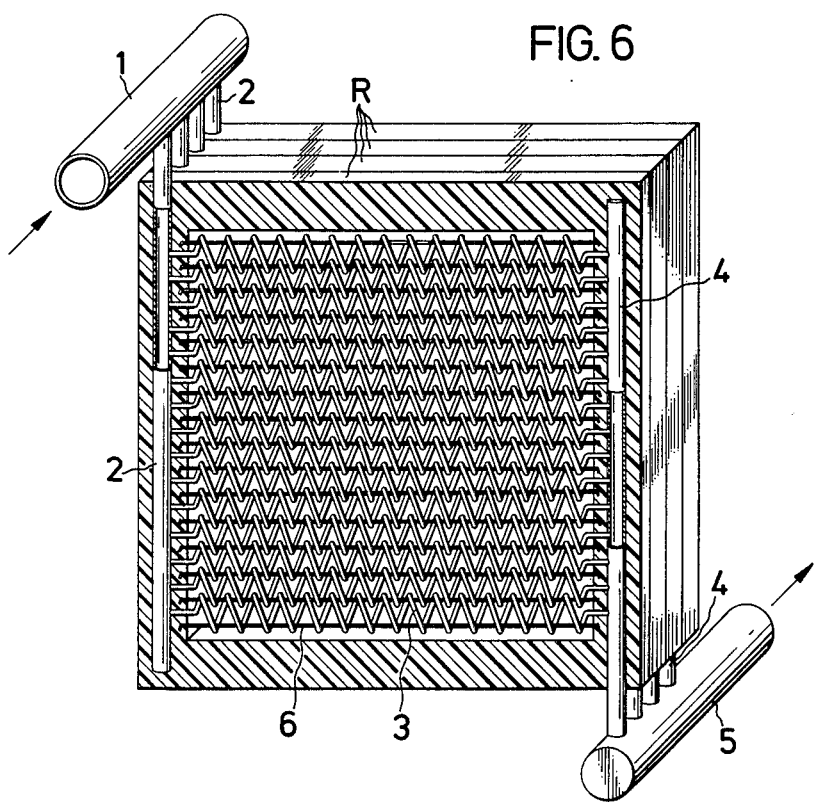
Figure 7:
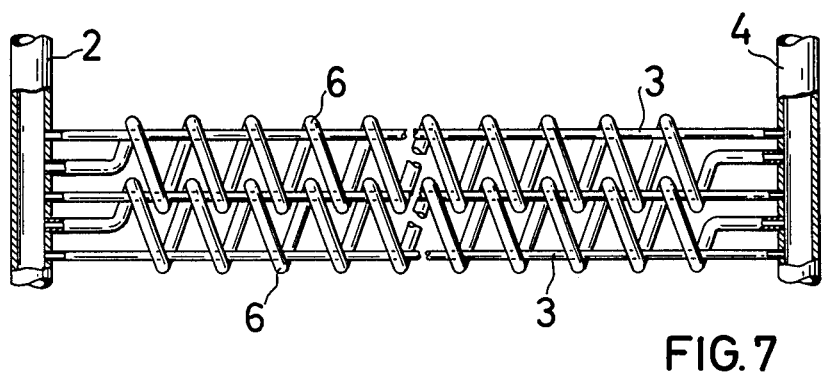

FIG. 1 here shows a helix of a heat exchange capillary (3) having the clear spacing $a_1$ between capillary windings. FIG. 2 is a section through the heat exchange capillary (3) in FIG. 1 along the line II/II; in FIG. 2, the clear width $a_2$ of the capillary winding and the clear height $a_3$ of the capillary winding are indicated. FIG. 3 shows a left-handed interlock of the heat exchange capillaries (3), FIG. 4 shows a right-handed interlock and FIG. 5 shows an alternately left-handed and right-handed interlock of the heat exchange capillaries (3). FIG. 6 represents a diagrammatic view of an arrangement of a plurality of heat exchanger elements, and FIG. 7 shows hollow interconnecting elements (6) joined to the forward flow and return flow headers.

By means of the heat exchangers, according to the invention, constructed from helically wound heat exchange capillaries (3), the effective length of the heat exchange tube per unit area covered is approximately doubled so that, under otherwise identical conditions, approximately twice the heat transfer capacity compared with straight tubes is obtained.

Since the production of thin-walled capillaries, for example from materials resistant to heat, acids or alkalis, does not cause any technical problems whatsoever (for example from polyvinylidene difluoride, polytetrafluoroethylene, stainless alloy steels, titanium), the use of the heat exchanger according to the invention is of interest to all sectors of technology and is not restricted to a few special part sectors. Due to the preferably quadrilateral, frame-type support structure of the individual support frames (R), which at the same time contain the headers (2) for the forward flow and the headers (4) for the return flow of the heat exchange medium flowing back, large and small heat exchanger packs or blocks of any desired capacity can be produced; the only point to watch is that the individual helices of the heat exchange capillaries (3) should as a rule always have the same pressure drop—that is to say, with the same internal diameter, they should have the same length—so that a uniform throughput of the heat exchange medium and hence a uniform heat transfer performance in each area section is obtained. Of course, it is also possible to use different capillary diameters and non-circular cross-sections of the heat exchange capillaries (3) per frame (R) or per block or pack, but in the end this always means special matching of the pressure drop of the individual helices of the heat exchange capillaries (3) and a special static design of the structure, depending on the material, and special production equipment. For these reasons, heat exchange capillaries (3) of circular cross-section are preferred. Each individual support frame (R) includes a group of capillary tubes (3) and each capillary tube of the group is parallel to and equally spaced apart from an adjacent tube in the group. The spaced apart connecting elements (6) are arranged so that each element interlocks an adjacent pair of capillary tubes.

In order to protect the helices of the heat exchange capillaries (3) during the free or forced flow of the heat exchange medium around them from local deflections, flexural vibrations or the like due to the turbulence which necessarily occurs—and which is desirable for the heat transfer—the heat exchange capillaries (3) are arranged with a mutual interlock and connected to one another by connecting elements (6); preferably, the connecting elements (6) are straight wires, or even capillaries, mounted between the support frames (R). FIGS. 3, 4 and 5 show this with particular clarity.

Heat exchange medium preferably also flows through the connecting elements (6), whenever this appears to be necessary or advantageous for protection at high temperature loads, that is to say for cooling. In this way, the use of other semi-finished products and/or different materials is avoided; for many reasons, this is frequently desirable (for example avoiding contact corrosion, differential expansion, weldability).

The individual adjacent helices of the heat exchange capillaries (3) are preferably arranged to be alternately left-handed and right-handed (FIG. 5) so that, when several frames are assembled—which can be arranged in the same direction or at right angles to one another—the best possible turbulence and the lowest possible pressure drops are obtained due to the continually alternating deflection of the outer heat exchange medium around the heat exchange capillaries. This contributes to particularly intensive heat transfer and reduces the required enclosed volume.

The structure of the support frame (R) can represent a single shaped component; however, the support frame (R) can also be produced in a separate working step after the insertion of the helices of the heat exchange capillaries (3) and the connecting elements (6) by injection-molding or the like. The lines (header 2, header 4) accommodated in the frame structures can be connected in a parallel arrangement within or outside the frames.

What is claimed is:

1. A heat exchanger, comprising a support frame and a feed line, a header for the forward flow, heat exchange tubes, a header for the return flow and a discharge line for a heat exchange medium, the heat exchange tubes including a plurality of individual helical capillary tubes (3) each extending between the forward flow header (2) and the return flow header (4), the axis of the helix of each tube being parallel and spaced apart from the axis of an adjacent tube and a plurality of spaced apart connecting elements (6) each interlocking an adjacent pair of capillary tubes.

2. The heat exchanger as claimed in claim 1, wherein the heat exchange capillary tubes (3) are composed of plastics.

3. The heat exchanger as claimed in claim 1, wherein the heat exchange capillary tubes (3) have an external diameter in the range from 0.1 to 10 mm and the wall thickness is 40% to 5% of the external diameter of the capillary tubes.

4. The heat exchanger as claimed in claim 1, including clear spacings ($a_1$) between adjacent windings of the helical capillary tubes (3), the clear spacings being 1 to 5 times the external diameter of the capillary tubes (3) and the capillary tubes having diameters in the range of 0.1 to 10.0 mm.

5. The heat exchanger as claimed in claim 1 wherein the forward flow and return flow headers are incorporated in the support frame of the heat exchanger.

6. The heat exchanger as claimed in claim 1, wherein the connecting elements (6) are composed of plastics.

7. The heat exchanger as in claim 1, wherein the connecting elements (6) are hollow and the ends thereof lead into the forward flow header (2), and the return flow header (4) whereby heat exchange medium flows through the connecting elements.

8. A heat exchanger as claimed in claim 1, wherein the plurality of individual capillary tubes (3) includes groups of tubes, and each capillary tube of the group is parallel to and equally spaced apart from an adjacent tube in the group.

* * * * *